United States Patent
Iversen

[11] Patent Number: 6,006,785
[45] Date of Patent: Dec. 28, 1999

[54] SUCTION VALVE FOR AN AXIAL PISTON COMPRESSOR

[75] Inventor: Frank Holm Iversen, Padborg, Denmark

[73] Assignee: Danfoss Compressors GmbH, Flensbburg, Germany

[21] Appl. No.: 09/155,335

[22] PCT Filed: Mar. 26, 1997

[86] PCT No.: PCT/DK97/00139

§ 371 Date: Sep. 23, 1998

§ 102(e) Date: Sep. 23, 1998

[87] PCT Pub. No.: WO97/38251

PCT Pub. Date: Oct. 16, 1997

[30] Foreign Application Priority Data

Apr. 6, 1996 [DE] Germany ............... 196 13 911

[51] Int. Cl.[6] ............................................. F16K 15/16
[52] U.S. Cl. ........................ 137/856; 137/855; 137/857; 471/571
[58] Field of Search ................. 137/855, 856, 137/857, 527; 471/571, 569, 565

[56] References Cited

U.S. PATENT DOCUMENTS

| | | | |
|---|---|---|---|
| 978,152 | 12/1910 | Gutermuth | 137/525.3 |
| 1,672,125 | 6/1928 | Heideman | 137/525 |
| 2,019,747 | 11/1935 | Taylor | 230/231 |
| 2,151,746 | 3/1939 | Cody | 137/856 |
| 3,568,712 | 3/1971 | Rinehart | 137/525.3 |
| 3,809,506 | 5/1974 | Malcosky | 417/571 |
| 3,811,468 | 5/1974 | Bellmer | 471/571 |
| 3,926,214 | 12/1975 | Hrabal | 137/856 |
| 3,998,243 | 12/1976 | Osterkorn et al. | 137/856 |
| 4,437,490 | 3/1984 | Demers et al. | 137/855 |
| 4,642,037 | 2/1987 | Fritchman | 137/856 |
| 5,016,669 | 5/1991 | Jamieson | 137/855 |
| 5,171,137 | 12/1992 | Todescat et al. | 417/571 |
| 5,456,287 | 10/1995 | Leu | 137/855 |
| 5,718,571 | 2/1998 | Rozek | 417/571 |
| 5,738,502 | 4/1998 | Lee | 137/856 |

*Primary Examiner*—Henry Bennett
*Assistant Examiner*—Joanne Y. Kim
*Attorney, Agent, or Firm*—Lee, Mann, Smith, McWilliams, Sweeney & Ohlson

[57] ABSTRACT

A suction valve for an axial piston compressor has a leaf spring fixed at one end, which spring at one end is fixed with a fixed portion between valve plate and cylinder block, at its other end covers over the suction valve opening with a closure portion and has an intermediate portion connecting these portions. The intermediate portion is located substantially outside the cylinder cross-section. A stop for the suction valve leaf spring is arranged in the region of the cylinder wall facing the fixed portion. This produces an optimum filling of the cylinder and thus an improvement in the efficiency of the compressor, as is especially desirable for refrigeration compressors.

12 Claims, 3 Drawing Sheets

$P_1 < P_2$ $P_1 = P_2$

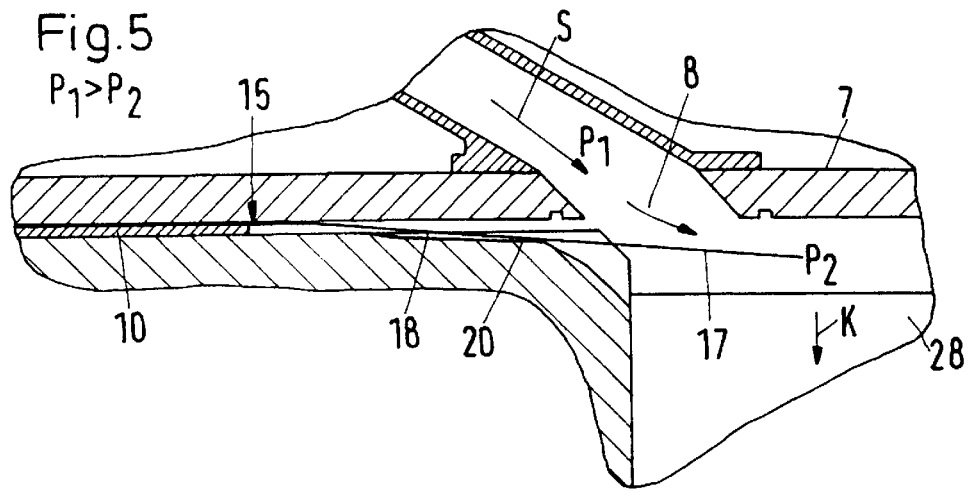
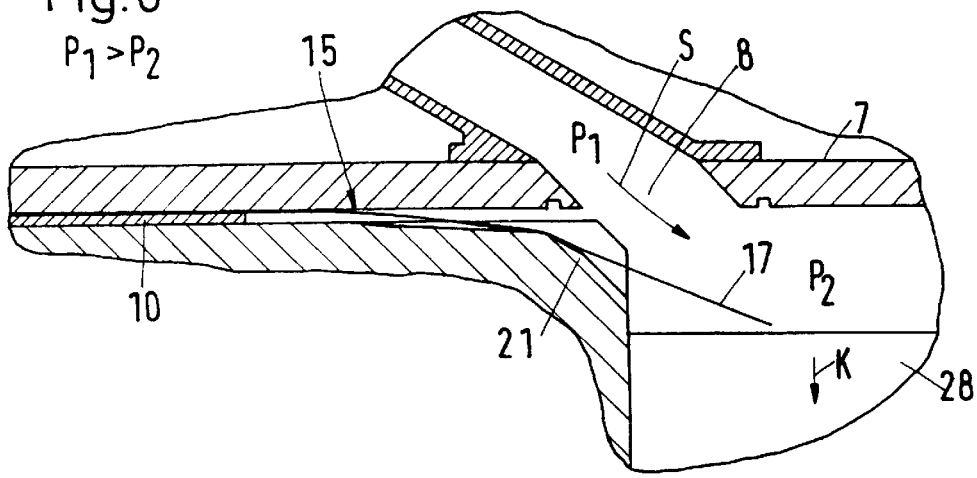
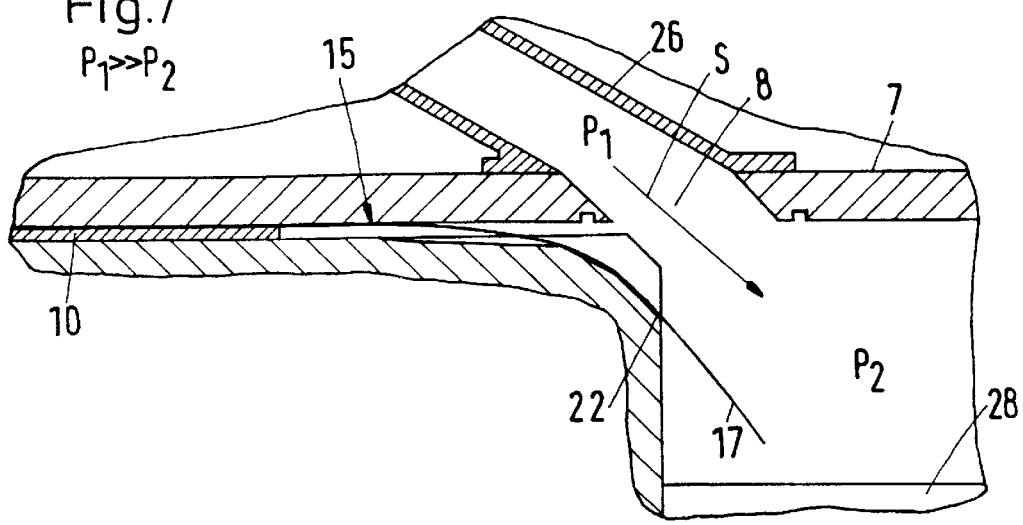

SUCTION VALVE FOR AN AXIAL PISTON COMPRESSOR

BACKGROUND OF THE INVENTION

The invention relates to a suction valve for an axial piston compressor, the cylinder block of which is covered over by a valve plate that has suction valve and discharge valve openings, having a leaf spring with one end fixed, which spring at one end is fixed with a fixed portion between valve plate and cylinder block, at its other end covers over the suction valve opening with a closure portion and has an intermediate portion connecting these portions, and also co-operates with a stop on the cylinder block as the suction valve opens.

In a known suction valve of that kind (U.S. Pat. No. 2,908,287), the fixed portion of the leaf spring with one end fixed is located close to the cylinder. The closure portion is located at the other end of the spring and co-operates with the stop. The intermediate portion therefore extends over a substantial part of the diameter of the cylinder.

When the suction valve is open and gas is to be sucked into the cylinder, the leaf spring is bent downwards. The flow of gas is here diverted from the suction valve opening to the cylinder wall. On contact with the cylinder wall the gas is heated and expands. The flow resistance and the heating reduce the amount of gas that is able to flow into the cylinder during the suction stroke of the compressor.

SUMMARY OF THE INVENTION

The invention is based on the problem of providing a suction valve of the kind described in the introduction, which allows optimum filling of the cylinder and thus increases the efficiency of the compressor, as is desirable in particular for refrigeration compressors.

That problem is solved according to the invention in that the intermediate portion is located substantially outside the cylinder cross-section and the stop is arranged in the region of the cylinder wall facing the fixed portion.

In this construction, at the start of the opening movement the characteristic is weak, because the leaf spring is able to deform over the length of the intermediate portion and the closure portion. As soon as the stop is reached, however, the opening characteristic becomes stiffer, because only the closure portion can still move. The new suction valve can therefore open more quickly and wider than the suction valves known to date. Filling of the cylinder during the suction stroke of the compressor is thus increased. Conversely, in the fully open position the suction valve closes more quickly because of the considerable stiffness and thus prevents backflow. This also increases the filling and thus the efficiency of the compressor. Moreover, it is possible to match the individual portions of the leaf spring accurately to the application, that is, the fixed portion to the fixing function, the intermediate portion to the bending function and the closure portion to the closing function. In this manner a valve is obtained which combines the advantages of a rigid valve and of a non-rigid valve.

Moreover, the closure portion forms with the valve plate an angle of which the apex lies close to the cylinder wall and which widens towards the middle of the cylinder. Gas consequently flows directly towards the middle of the cylinder, without first having to be deflected from the cylinder wall. This leads to a decrease in heating of the gas and therefore likewise to an improvement in the degree of fill.

An improvement is also achieved during the pressure stroke. A relatively large discharge valve opening can now be provided, without the gas discharged by way of the discharge valve being obstructed by the leaf spring of the suction valve, since substantially only the closure portion is located in the cylinder chamber.

In a preferred construction, provision is made for the end face of the cylinder block to have a recess for receiving the intermediate portion, which recess is bounded by an inclined ramp leading to the cylinder. The ramp enables the fixed portion to be arranged at a spacing from the cylinder yet still enables the intermediate portion to be movable. The stop is formed by means of the ramp.

The slope of the ramp is advantageously constant over its length. In conjunction with the bending line of the leaf spring, the stop is provided at the end of the ramp, in particular at the intersection point between ramp and cylinder wall.

As an equally advantageous alternative, the slope of the ramp increases towards the-cylinder from a smallest value. In this construction the stop of the intermediate portion is displaced during the opening movement from one end of the ramp to the other end thereof. The active part of the intermediate portion becomes continuously shorter during this. The opening characteristic therefore becomes gradually stiffer.

It is also favourable for the fixed portion to have at least two upturned lugs that engage in openings in the valve plate and/or the cylinder block. This produces an exact position of the leaf spring even in the region of the valve seat. The closure portion can therefore be given a smaller area projecting only a little beyond the suction valve opening. This measure also improves filling of the cylinder.

It is advantageous for the leaf spring to be bent in the opening direction in the region of the intermediate portion. The suction valve therefore closes on the pressure stroke of the piston, but opens by virtue of its own restoring force when the piston has reached top dead centre. The sucked-in gas is therefore able to flow from the start of the suction stroke onwards. In addition, the closure portion is prevented from clinging to the suction valve seat.

An arrangement in which the closure portion assumes in the open position an angle of at least 150 to the valve plate is recommended. In this way the losses due to deflection are kept small.

It is an advantage for a channel between intake sound absorber and suction valve opening to correspond to the opening direction of the closure portion. This reduces losses due to deflection and increases efficiency.

The suction valve opening is preferably arranged partly outside the cylinder cross-section. In this way it is possible to provided even relatively small compressors with large suction valve openings. There is nevertheless sufficient space for the discharge valve. In addition, there is a sloping feed for the suction gas which corresponds to the opening direction of the closure members.

It is furthermore advantageous for the suction valve opening to run at an angle through the valve plate so that the axis of the opening is inclined with respect to the cylinder axis. Because of this inclination of the suction valve opening, the gas flowing in from the intake sound absorber of the compressor enters the cylinder without substantial changes in direction.

BRIEF DESCRIPTION OF THE DRAWINGS

This improves filling of the cylinder and the efficiency of the compressor. The invention is explained in greater detail hereinafter with reference to preferred exemplary embodiments illustrated in the drawings, in which:

FIG. 2 is a partial plan view of the end face of the cylinder block and FIGS. 3 to 7 are partial sections through the suction valve region in different operating states.

DESCRIPTION OF THE PREFERRED EMBODIMENTS

Figure 1:
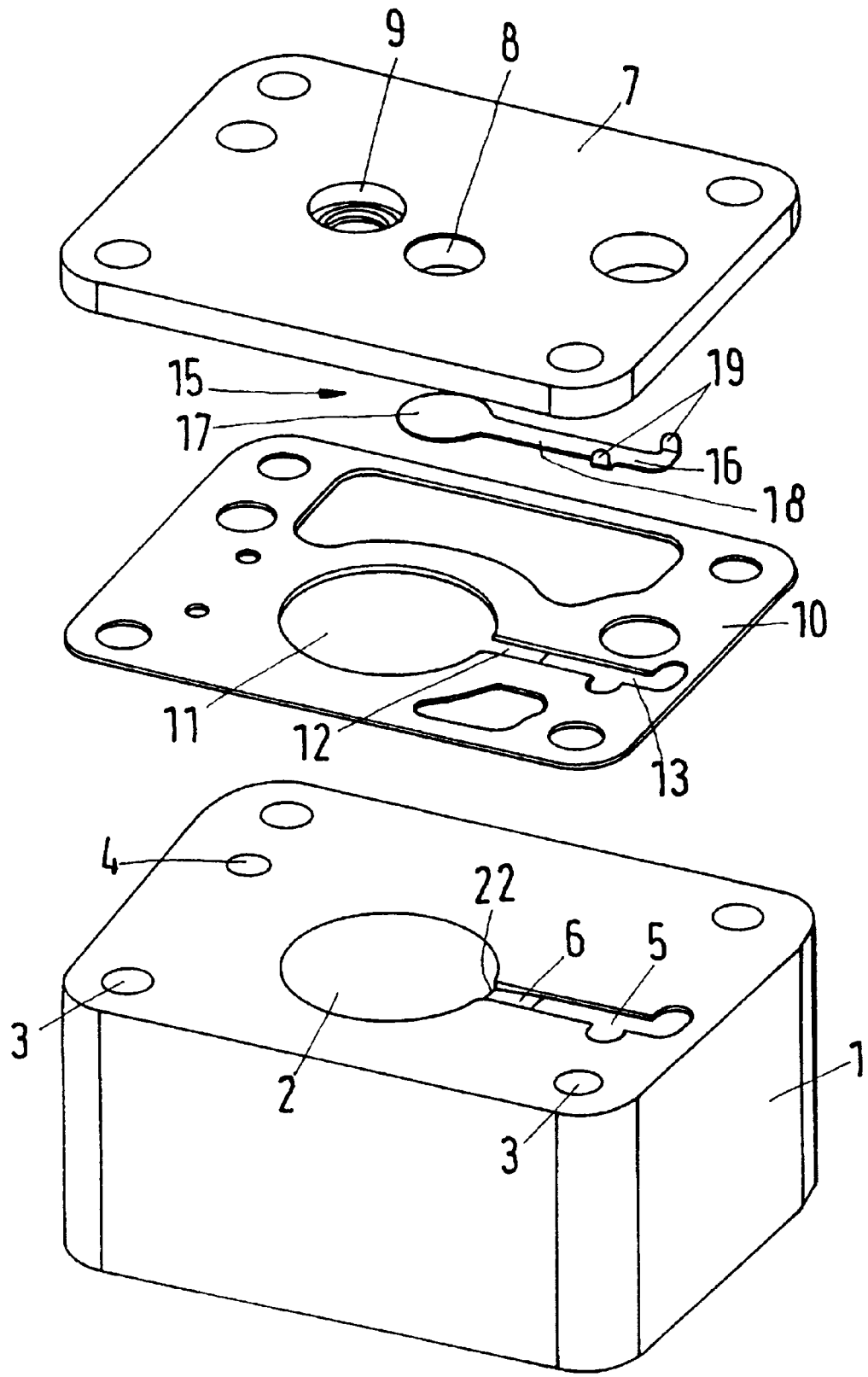
FIG. 1 is an exploded view of a cylinder block and a valve plate having a sealing plate and suction valve leaf spring arranged between them.

FIG. 1 shows a cylinder block 1 having a cylinder 2 provided in the form of a bore, four bores 3 for fixing screws to pass through, a pressure-side gas channel 4 and a recess 5 which is bounded in the direction towards the cylinder 2 by a sloping ramp 6. A valve plate 7 has a suction valve opening 8 and a discharge valve opening 9. Between cylinder block 1 and valve plate 7 there is a sealing plate 10 having an opening 11, which matches the cylinder 2 and has an extension 12, and having a recess 13, which on the underside of the sealing plate 10 has a projection engaging in a part of the recess 5.

A suction valve leaf spring 15 comprises a fixed portion 16, which is received in the recess 13 and is firmly held by the valve plate 7, a closure portion 17, which is able to cover over the suction valve opening 8, and an intermediate portion 18 which connects the fixed portion 16 and the closure portion 17 to one another. On the fixed portion 16 there are two lateral upturned lugs 19, which engage in complementary holes in the valve plate 7 and exactly fix the position of the suction valve leaf spring 15.

The ramp 6 is bounded by several faces or steps abutting at an angle so that edges 20, 21 and 22 are formed, the last-named edge 22 being located where the ramp 6 meets the cylinder wall 23. In addition, the suction valve leaf spring is bent at an angle in the opening direction in the region of the intermediate portion 18, namely, at the bend 24.

Figure 2:
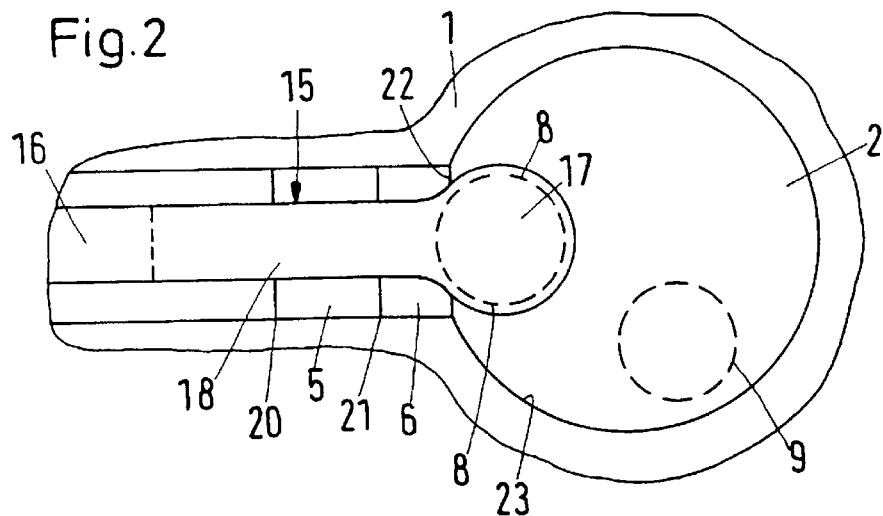

In FIG. 2, the position of the suction valve opening 8 and the position of the discharge valve opening 9 are indicated by broken lines. It is plain that the gas under pressure, which flows out by way of the discharge valve opening 9, is not obstructed by the suction valve leaf spring 15. From FIG. 3 it is apparent that in the region of the suction valve opening 8 there is a valve seat 25, which in its turn is surrounded by an annular groove. The suction valve opening 8 lies partially outside the cross-section of the cylinder 2. Its centre line lies obliquely with respect to the cylinder axis. An adjoining channel 26 of the intake sound absorber likewise runs obliquely. To allow gas to enter freely, an oblique surface 27 can be provided at the transition from the cylinder wall 23 to the end wall of the cylinder block 1.

The various valve positions in dependence on the stroke of the piston 28 are illustrated in FIGS. 3 to 7. The movement of the piston is indicated by the arrow K.

Figure 3:
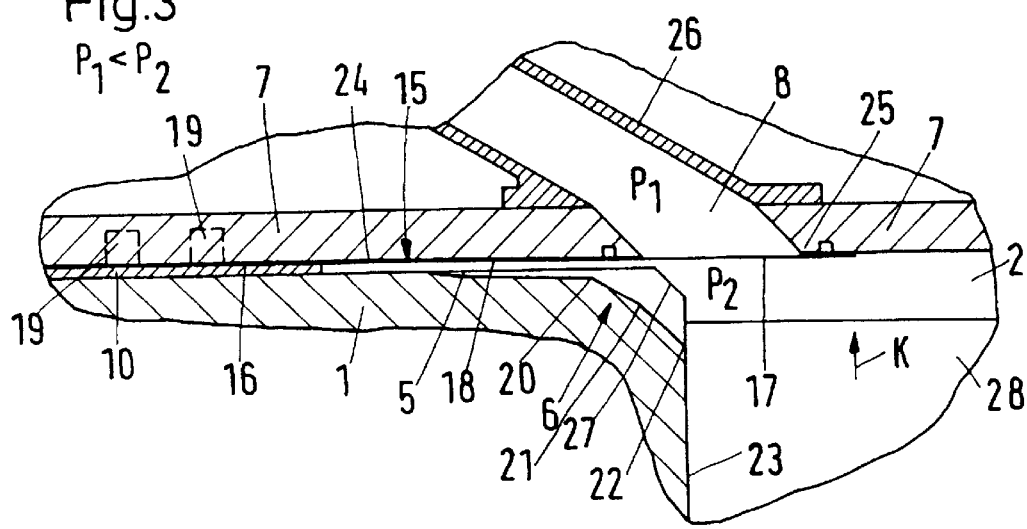

FIG. 3 shows the pressure stroke with the piston 28 moving upwards. The pressure P2 in the piston-swept space is considerably larger than the pressure P1 on the intake side. The closure portion 17 is therefore pressed against the valve seat. The suction valve is securely closed.

Figure 4:
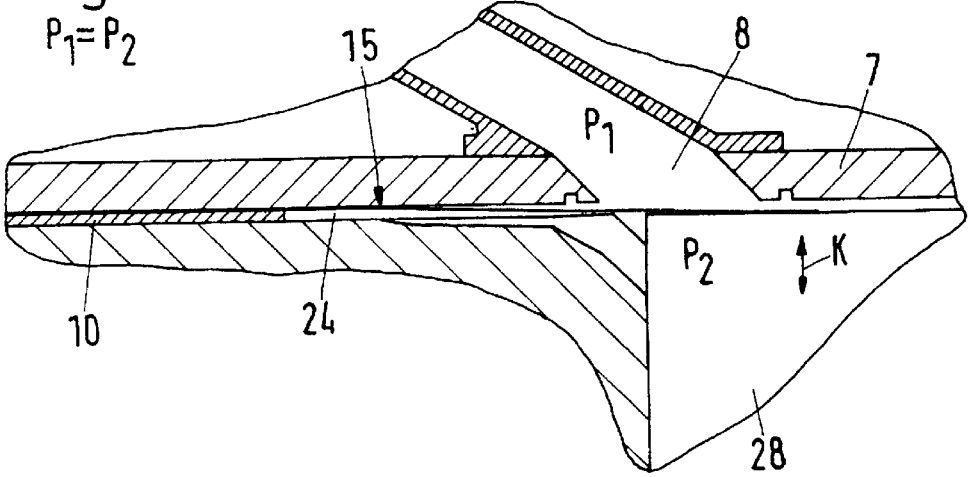

In FIG. 4, top dead centre has been reached. The pressures P1 and P2 are equal. On reversal of motion the leaf spring 15 is merely under the bias that is caused by the bend 24. Under the influence of this resilient force the suction valve opens slightly, so that during the following intake stroke suction gas is able to enter the cylinder 2 right from the start.

FIG. 5 shows the start of the suction stroke. The closure member 17 is carried along by the suction force of the cylinder 28 until the leaf spring 15 rests against the edge 20. The characteristic, which until now has been weak, becomes firmer as the free length of the leaf spring 15 becomes shorter. The closure portion 17 has reached a certain open position which, at that instant when the piston is still moving comparatively slowly, is adequate. The flow of suction gas is indicated by the arrows S.

In FIG. 6, the closure portion 17 has moved yet further away from the valve seat. The leaf spring 15 now lies on the edge 21. The characteristic has become even firmer.

FIG. 7 finally shows the state in which the leaf spring 15 is deflected to its fullest extent. The spring now bears on the edge 22 so that the characteristic becomes even firmer. As a consequence, as the piston reverses its movement at bottom dead centre, closure of the suction valve is assisted by the restoring spring of the leaf spring and therefore no losses occur during the pressure stroke.

In the widest open position of the suction valve (FIG. 7), the closure portion 17 lies at an angle of about 45°, that is, more than 15°, to the valve plate 7. The channel 26 carrying suction gas and the suction valve opening 8 have a similar inclination with respect to the valve plate 7. They also have the same radial course as the leaf spring 15. As a result, the suction gas S enters the cylinder 2 virtually unhindered, and there reaches the region of the cylinder axis without previously having been heated by excessive contact with the hot cylinder walls.

In many cases a single stop, for example the edge 22, would be sufficient to support the leaf spring 15, as is illustrated in FIG. 1. On the other hand, the inclination of the ramp can also change continuously, so that the characteristic of the leaf spring likewise changes gradually.

It is claimed:

1. Suction valve for an axial piston compressor, the compressor having a cylinder block with at least one cylinder and being covered by a valve plate having suction valve and discharge valve openings, the suction valve comprising a leaf spring having a fixed portion at one end, said fixed portion being fixed between the valve plate and the cylinder block, the leaf spring also having a closure portion at an opposite free end, said closure portion substantially overlapping a cross section of the cylinder and covering the suction valve opening, and the leaf spring having an intermediate portion connecting the fixed portion and the closure portion, the intermediate portion being located substantially radially outside the cylinder cross section and co-operating with a stop on the cylinder block as the suction valve opens, the stop being located in a region of a wall of the cylinder adjacent to the fixed portion.

2. Suction valve according to claim 1, in which the cylinder block has an end face having a recess for receiving the intermediate portion, which recess is bounded by an inclined ramp leading to the cylinder.

3. Suction valve according to claim 2, in which the ramp has a slope which is constant over its length.

4. Suction valve according to claim 2, in which the ramp has a slope which increases towards the cylinder.

5. Suction valve according to claim 4, in which the increase of the slope is continuous.

6. Suction valve according to claim 4, in which the increase of the slope is in a series of steps.

7. Suction valve according to claim 1, in which the fixed portion has at least two upturned lugs that engage openings in at least one of the valve plate and the cylinder block.

8. Suction valve according to claim 1, in which the leaf spring is bent in the intermediate portion in an opening direction of the closure portion.

9. Suction valve according to claim 1, in which in an open position the closure portion assumes an angle of at least 15° to the valve plate.

10. Suction valve according to claim 1, including an intake sound absorber having a channel, the channel and the suction valve opening being inclined in the opening direction of the closure portion.

11. Suction valve according to claim 1, in which the suction valve opening is located partly outside the cross section.

12. Suction valve according to claim 1, in which the suction valve opening extends obliquely through the valve plate and has an axis inclined with respect to the axis of the cylinder.

* * * * *